Patented Oct. 8, 1935

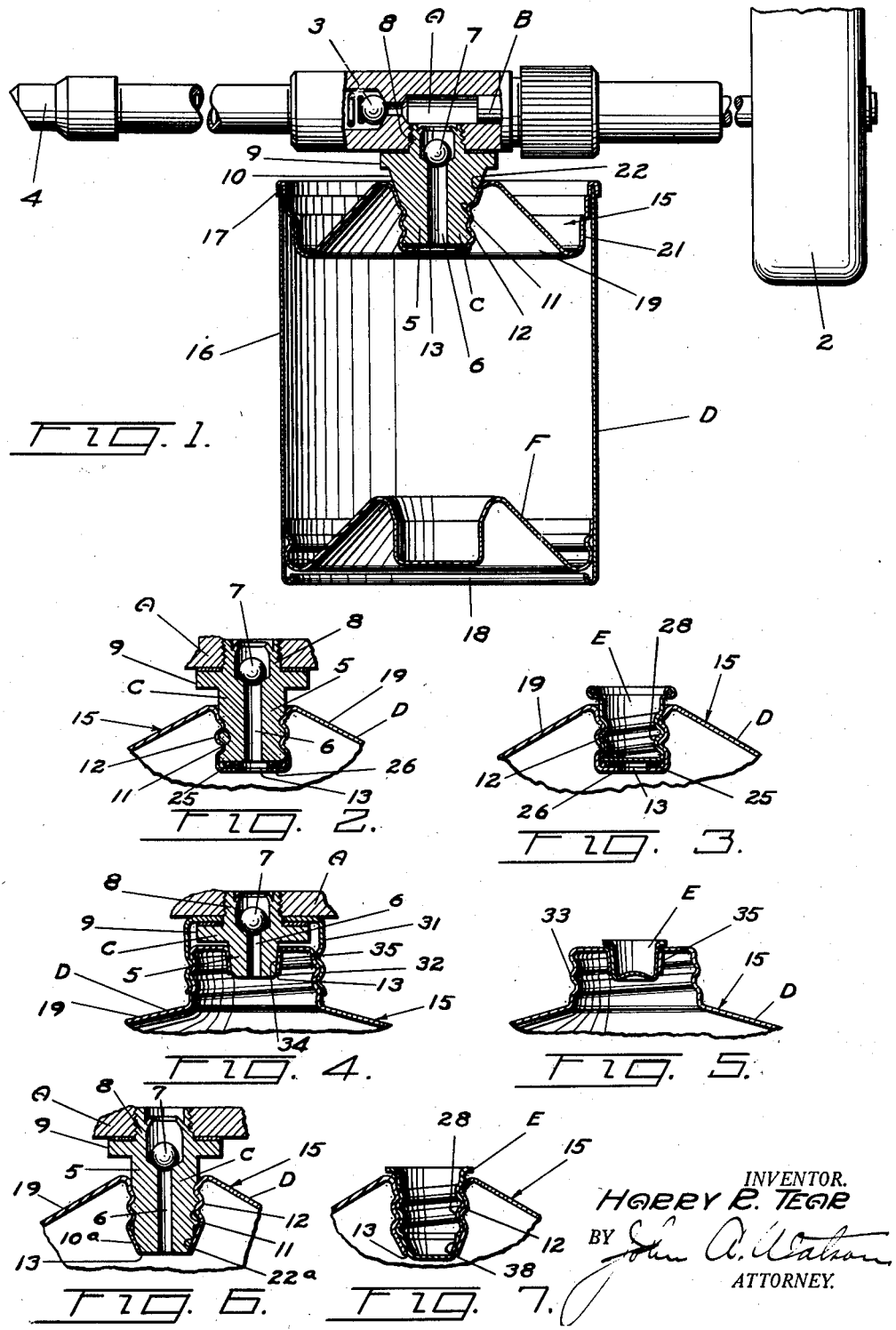

2,016,400

UNITED STATES PATENT OFFICE 2,016,400

LUBRICATING DEVICE

Harry R. Tear, South Bend, Ind., assignor to The Lubrication Corporation, South Bend, Ind., a corporation of Delaware Application October 15, 1932, Serial No. 637,916

10 Claims. (Cl. 221—47.4)

This invention relates to improvements in lubricating devices, and more particularly, to lubricant guns and lubricant cartridges therefor.

An object of the invention is to provide a lubricant gun or dispenser, and cartridge therefor, wherein simple and effective means is employed for simultaneously securing the cartridge to the gun and for establishing a fluid tight seal therebetween.

Another object is to provide a lubricant cartridge for use with lubricant guns or dispensers wherein the instrumentality for supporting the cartridge upon the gun and for maintaining a seal therebetween is employed for retaining a closure cap for the cartridge in sealing engagement therewith prior to attachment of the cartridge to the gun or dispenser.

A further object is to provide gun cartridge mounting means effective to provide a lubricant tight seal between the cartridge and the gun of a character wherein forces tending to move the cartridge out of normal position relative to the gun may not destroy the seal therebetween. This feature is of particular importance in such cases as where no protective housing is employed to surround the cartridge.

Other objects, the advantages and uses of the invention, will be apparent after reading the following description and claims and after consideration of the accompanying drawing forming a part of this specification, in which:

Fig. 1 is an elevation, partly in section, of a hand lubricant gun and cartridge affixed thereto constructed in accordance with the invention;

Fig. 2 is a fragmentary sectional view of another form of the cartridge attachment and sealing means;

Fig. 3 is a sectional view of the cartridge structure of Fig. 2 with its closure cap in place;

Fig. 4 is a view similar to Fig. 2 of another embodiment of the invention;

Fig. 5 is a view similar to Fig. 3 of the embodiment of Fig. 4;

Fig. 6 is a view similar to Fig. 2 of a further embodiment of the invention; and Fig. 7 is a view similar to Fig. 3 of the embodiment of Fig. 6.

The various forms of the invention selected for illustration herein, in general comprise, a lubricant gun of the hand operated type having a pressure cylinder A within which a piston B is mounted for manual operation, a cartridge connector stud assembly C for supporting the lubricant cartridge D upon the gun, for establishing communication between the cartridge and pressure cylinder A, and for simultaneously providing a lubricant tight seal therebetween; a closure cap E for the cartridge held in place to form a lubricant tight closure seal therefor by the same instrumentality employed in mounting the cartridge upon the connector stud assembly of the gun, and a piston follower F within the cartridge adapted to move under atmospheric pressure to follow the lubricant as it is withdrawn therefrom into the pressure cylinder A.

Referring particularly to Fig. 1, the lubricant gun illustrated is of the simple hand type having a hand grip 2 upon the outer end of the piston B, an outlet check valve 3 for the cylinder A and a discharge nozzle 4 adapted for engagement with a lubricant receiving fitting (not shown). The cartridge connector stud assembly C includes a connector stud 5 having a passageway 6 therethru, a check valve 7 in the passageway and an externally threaded shank 8 for reception and support within an internally threaded bore through the side wall of the cylinder A. The connector stud 5 is further formed with a hexagonal flange 9, for turning the stud in place within the threaded bore of the cylinder wall, an external conical walled portion 10 below the flange 9 and coarse screw threads 11 at the outer end of the stud for engagement with threads 12 rolled in the side wall of the cartridge outlet opening 13.

The cartridge D is preferably cylindrical in form, having one end closed by an end plate 15 through which the outlet 13 is provided. The end plate may be secured to the side walls 16 of the cartridge by a seam 17 so as to become a permanent part of the cartridge. The lower end of the side walls 16 may be rolled inwardly as shown at 18 for the purpose of reinforcement and for retaining the follower F against removal from within the cartridge. The central portion 19 of the end plate 15 presents an outwardly extending conical wall having the walls of the cartridge outlet opening 13 located and extending inwardly of the apex thereof. A forwardly extending flange 21 at the outer edge of the conical portion 19 provides that portion of the end plate which is joined to the walls 16 of the cartridge by the seam 17. This construction affords considerable flexibility in the cartridge end wall so that lateral blows or impact subjected to the cartridge as through abusive handling or dropping of the gun may not impair the seal afforded by engagement of the connector stud and cartridge outlet walls.

In that form of the cartridge illustrated in Fig. 1, the walls of the cartridge outlet opening above the threads 12 is fashioned to conform to the conical surface 10 of the connector stud 5 as shown at 22 so that when the cartridge is turned upon the stud, a lubricant tight seal is formed by contact under mechanical pressure between the surface 10 and the conical wall 22 to provide a wedging action.

The contour of the follower piston F is such as to closely follow that of the inner wall of the end plate 15, an arrangement which assures the removal of all of the cartridge contents.

In use, the cartridge D may be supplied to the consumer with a screw plug E constructed to follow in contour the outline of the connector stud 5 including the conical surface 10 whereby the outlet opening 13 of the cartridge may be sealed until the cartridge is ready for use upon a gun as shown. The follower piston F serves as the lower end wall of the cartridge. To install the cartridge D upon the gun, the operator may remove the plug E and screw the cartridge in place upon the connector stud 5 until the surface 10 of the stud engages tightly with the wall 22 of the cartridge outlet thereby through wedging action providing a lubricant tight seal therebetween. The seal thus formed may not be impaired by jar or impact applied to the cartridge or by forces tending to cause relative angular movement therebetween as the head structure 15 of the cartridge as described affords high flexibility.

In Figs. 2 and 3, another form of the cartridge and connecting means is illustrated, wherein a seal may be established between the connector stud 5 and the cartridge by a gasket 25 disposed between the lower end of the stud and an internally extending flange 26 formed at the lower end of the walls defining the cartridge outlet opening. The stud 5, as in the case of the stud of Fig. 1, has external screw threads 11 engageable with rolled threads 12 formed in the walls of the outlet 13. A closure cap E is shown in Fig. 3 which may be spun out of sheet metal providing external threads 28 engageable with the threads 12 to firmly hold the cap in place and to compress the gasket 25 to thus seal the cartridge when not in place upon the gun.

That form of the cartridge and cartridge connector means illustrated in Figs. 4 and 5 differs generally from the structure of Figs. 1 to 3 in that a sheet metal socket 31 encompassing the stud 5 and provided with threaded side walls 32 is employed to support the cartridge upon the gun by engagement of external threads 33, formed upon an extension of the cartridge end plate 15, with the threads of the socket as shown in Fig. 4. A lubricant tight seal between the cartridge outlet opening 13 and the stud 5 is established through the medium of a slight taper formed on the side walls of the stud as shown at 34, which provides a wedging action between the stud and similarly tapered side walls 35 of the opening 13 located centrally and within the externally threaded extension of the cartridge head. The closure cap E for this form of the cartridge is provided with tapered side walls as shown in Fig. 5 and when pressed into place will remain so due to friction until pried away at such time as when the cartridge is to be placed upon the gun.

The cartridge and connector means of Figs. 6 and 7 is similar to that of Fig. 1 except that the conical wall 10a of the stud 5 is below the threads 11 and likewise the surface 22a of the cartridge outlet wall is below the rolled thread 12 therein. The supporting and sealing function of the cartridge connector means operates in the same manner as that of Fig. 1. A threaded plug E, having a tapered end 38 engageable with the surface 22a and threads 28 may be employed to seal the cartridge when not in use upon the gun. The structure of Figs. 4 and 5 is disclosed and claimed in my copending application Serial No. 11,552, filed March 18, 1935.

It is to be understood that the described embodiments of the invention herein set forth are presented for the purpose of illustration only and various changes may be made therein without departing from the spirit and scope of the invention.

I claim:

1. A lubricant cartridge for use with a lubricant feeding device, comprising, a commercial lubricant package having an outlet opening centrally located at one end, the walls of said opening extending into the receptacle and being formed with screw threads said walls having a conical surface at one end of the screw threads for engagement with an element of said lubricant feeding device to provide a seal therewith.

2. A lubricant cartridge for use with a lubricant feeding device, comprising a hollow receptacle having a flexible end wall provided with an outlet opening therethrough, the walls of said opening extending into the receptacle and being formed with screw threads said walls having a conical surface at one end of the screw threads for engagement with an element of said lubricant feeding device to provide a seal therewith.

3. A lubricant cartridge for use with a lubricant feeding device, comprising a hollow receptacle having an outlet opening centrally located at one end, the walls of said opening extending into the receptacle and being formed with screw threads said walls having a conical surface at one end of the screw threads for engagement with an element of said lubricant feeding device to provide a seal therewith, and a sealing cap for said outlet opening having external screw threads and a conical surface engageable with and conforming in contour with the threads and conical surface of said outlet wall.

4. A lubricant cartridge for use with a lubricant feeding device having a threaded connector stud, comprising a hollow receptacle having an elongated passageway in one end, the walls of which extend into the receptacle and are adapted for threaded engagement with said connector stud, said passageway being further formed with an inwardly extending flange, and a gasket disposed upon said flange for compression between the flange and the end of said connector stud when the cartridge is engaged therewith.

5. A lubricant cartridge for use with a lubricant feeding device having a threaded connector stud, comprising a hollow receptacle having an elongated passageway in one end, the walls of which extend into the receptacle and are adapted for threaded engagement with said connector stud, said passageway being further formed with an inwardly extending flange, a gasket disposed upon said flange for compression between the flange and the end of said connector stud when the cartridge is engaged therewith, and a cap for closing said passageway having threads engageable with the threaded walls of the passageway to draw the cap into engagement with the gasket.

6 In combination, a lubricant feeding device having a cartridge connector stud providing an inlet for the device and support for a lubricant cartridge, said stud having screw threads formed on its outer side wall and having another portion of its side wall conical in shape, and a lubricant cartridge comprising a commercial lubricant package having an outlet opening, the side walls of which are located inwardly of the body of the cartridge and are fashioned for engagement and cooperation with said threads and conical wall of said stud to support the cartridge upon the stud and to provide a lubricant tight seal therebetween.

7. In combination, a lubricant feeding device having a cartridge connector stud, providing an inlet for the device and support for a lubricant cartridge, said stud having screw threads formed on its outer side wall and having another portion of its side wall conical in shape, and a lubricant cartridge comprising a commercial lubricant package formed with a flexible end wall provided with an outlet opening, the side walls of which are located inwardly of the body of the cartridge and are fashioned for engagement and cooperation with said threads and conical wall of said stud to support the cartridge upon the stud and to provide a lubricant tight seal therebetween.

8. In combination, a lubricant gun in unit assembly having a connector stud, a cartridge forming a commercial lubricant package having an outlet opening, cooperating wedging contact surfaces formed on the adjacent walls of said connector stud and said outlet opening for establishing a fluid tight seal between said stud and said cartridge and screw thread means located inwardly of the cartridge body for drawing the cartridge toward said stud.

9. In combination, a lubricant gun in unit assembly having a connector stud, a cartridge forming a commercial lubricant package having an outlet opening the walls of which are located within the body of the cartridge, cooperating wedging contact surfaces formed on the adjacent walls of said connector stud and said outlet opening for establishing a fluid tight seal between said stud and said cartridge, and means associated with the outer wall of said stud and the inner wall of said outlet opening for drawing the cartridge toward said connector stud.

10. A lubricant cartridge for use with a lubricating gun having a connector stud, comprising a hollow receptacle having an outlet opening extending into the receptacle and in one wall thereof, the walls of said opening being provided with screw threads at the outer end and with a conical portion at the inner end converging inwardly, said threads and said conical portion of the outlet wall being adapted for engagement with similar and complementary portions formed on said connector stud.

HARRY R. TEAR.